_United States Patent Office_  3,395,883  
Patented Aug. 6, 1968

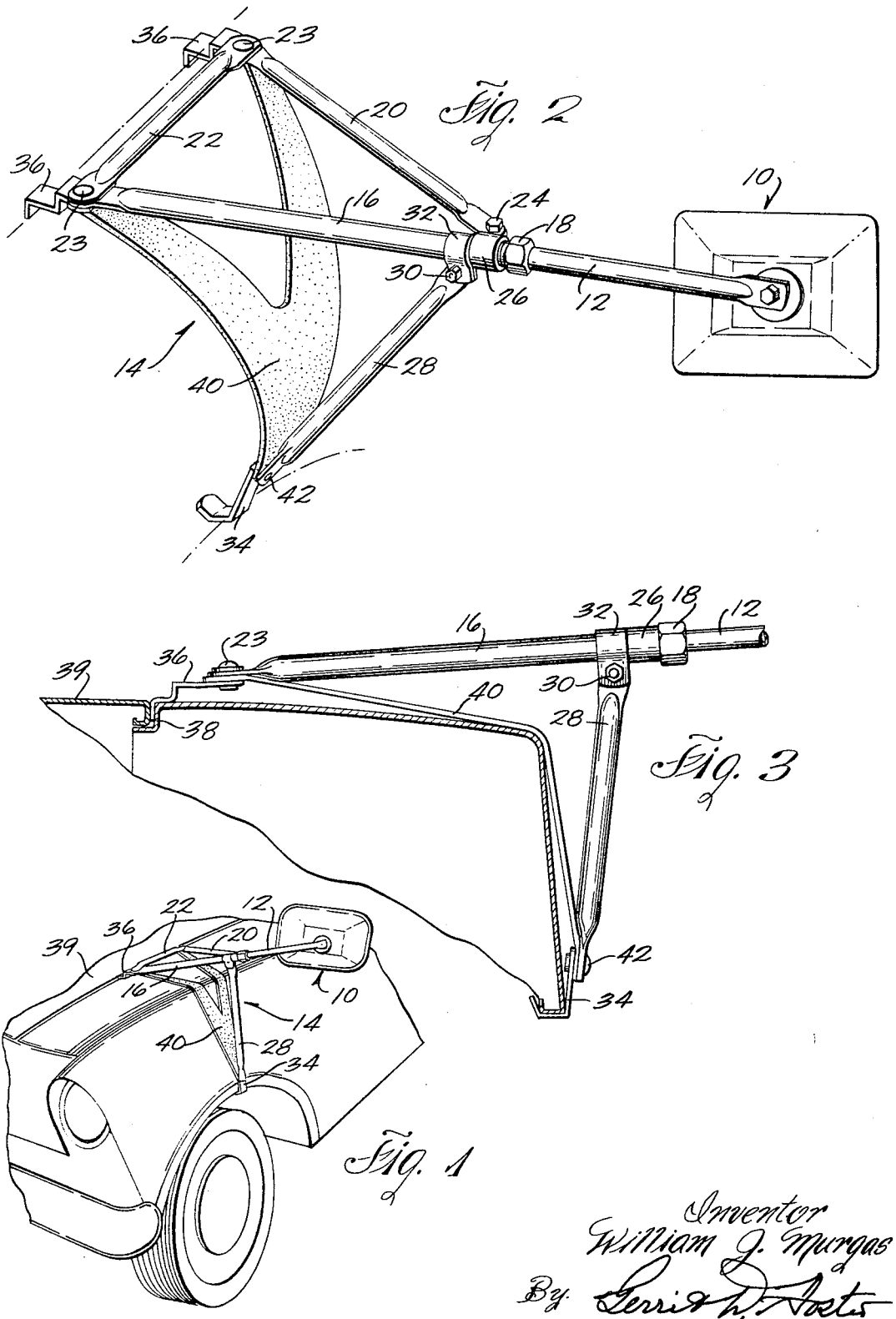

3,395,883  
DETACHABLE FENDER MOUNTED REAR VIEW MIRROR  
William J. Murgas, Wauwatosa, Wis., assignor to Velvac, Inc., Milwaukee, Wis., a corporation of Delaware  
Filed Dec. 28, 1966, Ser. No. 605,490  
5 Claims. (Cl. 248—480)

ABSTRACT OF THE DISCLOSURE

This disclosure comprises a three point connection mirror-mounting unit adapted to be readily removably mounted on the front fender of an automobile. The three points of connection are interconnected by a Y-shaped clamping rubber which presses against the face of the fender and with the three points of connection holds the unit firmly in place.

BACKGROUND OF THE INVENTION

(1) *Field of invention*

This invention relates to detachable mountings or supports for outside rear view mirrors of the type employed on passenger cars and small trucks while towing trailers and the like, and particularly to such mountings which are attached to the fenders of such vehicles.

(2) *Description of the prior art*

In U.S. Patent 3,081,057 there is shown an outside rear view mirror mounted on the fender of a motor vehicle. However, this is a permanent mounting employing a hook which is held by screws to the edge of the engine compartment. The use of springs, straps, shock cord and flexible tubing to hold the mirror-mounting device to the door of a vehicle are shown in U.S. Patents 3,114,530, 3,142,469, 3,166,283, 3,172,633, 3,186,672, 3,260,490. However, none of these mountings could be used to readily attach and detach the unit to the fender of the vehicle and hold it steady.

SUMMARY OF THE INVENTION

The essence of this invention is the use of a tripodal frame and a Y-shaped clamping rubber. The frame has two feet designed to engage the top edge of the fender at the motor well at widely spaced places. The third foot is designed to hook on the lower edge of the fender at the wheel well. The Y-shaped clamping rubber is connected to all three feet and when stretched into mounted position rests in part against the surface of the fender. It thus holds the feet in clamped position and mounts the frame firmly in place with minimal vibration.

The braces and leg are relatively adjustable to avoid contact with fenders of varying shapes. The unit can be taken from its carton installed on the fender or removed from the car and packed in its carton in less than 20 seconds. Since no nuts, bolts, screws or turn buckles are used the finish of the car will not be marred.

BRIEF DESCRIPTION OF THE DRAWING

In the drawing:  
FIG. 1 is a fragmentary perspective view of the exterior of the driver's side of a motor vehicle showing the rear view mirror-mounting embodying the present invention detachably fixed to the fender of such vehicle;  
FIG. 2 is a perspective view of the mirror-mounting as detached from the vehicle preparatory to being attached thereto;  
FIG. 3 is a fragmentary sectional view through the left hand fender of the vehicle and a view in elevation of the mounting for such rear view mirror.

DESCRIPTION OF THE PREFERRED EMBODIMENT

Referring to the drawing by reference numerals the rear view mirror includes (a) a mirror head assembly 10 adjustably mounted on an extension 12 all of conventional well-known design, and (b) a mounting indicated generally at 14.

The mounting 14 is of tripodal shape when extended for attaching to the fender of the vehicle. The upper triangle consists of a tube 16 threaded at its outer end to receive a clamping nut and sleeve 18. The extension 12 is telescopically received in this tube and can be adjusted in and out depending upon the width of the trailer or other load. The other parts of the upper triangle are a lateral brace 20 and longitudinal brace 22. The brace 22 is secured to brace 20 and tube 16 by rivets 23. As set forth later these same rivets also secure the clamping rubber and stepped hood feet.

The brace 20 is pivoted by a clamping bolt and nut 24 to a clamp 26 surrounding the tube 16. By loosening this bolt and nut the clamp 26 may be adjustably positioned along the tube 16 to change the angle of the tube 16 laterally with respect to the brace 22.

The upper triangle of the mounting 14 is supported at its outer end by a leg 28. This leg is pivoted at its upper end by a clamping bolt and nut 30 to a clamp 32, surrounding the tube 16. To the lower end of the leg 28 is attached a fender foot 34. By adjusting the clamp 32 along the tube 16, the angle of such tube can be adjusted relative to horizontal.

The inner ends of the upper triangle have stepped hood feet 36 which are bent as shown in FIG. 3 to engage the inner face 38 of the edge of the fender forming the motor well. No screws or other fastening means are used to secure the feet 36 to such edge. Thus, the motor hood 39 can be opened and closed without disturbing the mounting 14.

In order to maintain the fender foot 34 and hood feet 36 in fender gripping position, a Y-shaped clamping rubber 40 shaped as shown has each of the outer ends of its legs secured to such feet by the rivets 23 and a tubular rivet 42 all of which also secure these feet to the tripodal mounting 14. This clamping rubber should have a durometer reading of at least 50 and a tensile strength of 2000 pounds. It is advisable to form the holes through which the rivets pass in thicker embossed rings formed on the end portions of such clamping rubber. Rubber coated washers may also be positioned on opposite faces of the clamping rubber at such holes to increase the frictional clamping area and resist the tearing out of the rivets when the unit is stretched and placed on the fender. Each of the feet may also be rubber coated to prevent marring of the finish.

When the mirror-mounting unit is removed from the carton, the leg 28 is collapsed and lies substantially in the same plane as the upper triangle. The mirror head assembly may or may not be connected when stored. In either event the unit is most easily mounted by catching the fender foot 34 under the fender well edge and lifting the brace 22 to stretch the clamping rubber 40 and seat the hood feet 36 against the inner face 38 of the motor well. The tension in the clamping rubber securely holds the feet in clamping engagement and its frictional engagement with parts of the surface of the fender assists in firmly holding the unit in place with the mirror adjusted in the proper position.

To dismount the unit, the brace 22 is grasped and lifted to stretch the clamping member and disengage the hood feet from the face 36.

I claim:  
1. A support for an outside rear view mirror capable of quick attachment to and removal from the fender of a motor vehicle comprising:
a tripodal frame having (1) a head portion adapted to hold a mirror head assembly, and (2) three end portions, one of said end portions being movable relative to the other end portions;
stepped feet carried by two of said end portions, said feet being rigidly spaced and shaped to engage the inner face of an edge of a vehicle fender forming the motor well;
a fender foot carried by a third end portion of said frame and shaped to engage the lower edge of a vehicle fender at the wheel well; and
a Y-shaped clamping rubber having two of its end portions secured to said two end portions of said frame and the stepped feet carried thereby and a third end portion secured to said third end portion of said frame and the fender foot carried thereby.

2. A support as set forth in claim 1 wherein said tripodal frame consists of:
a first brace having end portions to which said stepped feet are secured to maintain said feet in fixed spaced relation;
a second brace pivotally connected to an end portion of said first brace;
a tube pivoted to the other end portion of said brace;
an adjustable clamp between said second brace and said tube;
a leg to which said fender foot is secured; and
a slidably adjustable clamp between said leg and said tube providing relative pivoting therebetween.

3. A support as set forth in claim 2 wherein:
said two end portions of said Y-shaped clamping rubber are secured to the end portions of said first brace and stepped feet by the same fastening means which pivotally interconnects said first brace and second brace and said first brace and said tube; and
said third end portion of said Y-shaped clamping rubber is secured to the end portion of said leg and to said fender foot by a common fastener.

4. A support as set forth in claim 3 wherein:
said stepped feet and said fender foot are encased in rubber.

5. A support as set forth in claim 4 wherein:
rubber coated washers are positioned between the metal portions of said frame and the end portions of said Y-shaped clamping rubber.

References Cited

UNITED STATES PATENTS

| | | | |
|---|---|---|---|
| 3,081,057 | 3/1963 | Fransworth | 248—484 |
| 3,114,530 | 12/1963 | Shilling | 248—226 |
| 3,142,469 | 7/1964 | Clemmer | 248—487 |
| 3,172,633 | 3/1965 | Allen | 248—226 |
| 3,186,672 | 6/1965 | Weder | 248—480 |
| 3,260,490 | 7/1966 | Trautner | 248—480 |

ROY D. FRAZIER, *Primary Examiner.*

FRANK DOMOTOR, *Assistant Examiner.*